United States Patent [19]

Roeseler

[11] Patent Number: 4,765,602
[45] Date of Patent: Aug. 23, 1988

[54] COMPOSITE COIL SPRING

[75] Inventor: William G. Roeseler, Bellevue, Wash.

[73] Assignee: The Boeing Company, Seattle, Wash.

[21] Appl. No.: 452,311

[22] Filed: Dec. 22, 1982

Related U.S. Application Data

[63] Continuation-in-part of Ser. No. 221,022, Dec. 28, 1980, abandoned.

[51] Int. Cl.$^4$ .............................................. F16F 1/36
[52] U.S. Cl. .................... 267/148; 267/166; 423/371
[58] Field of Search ............ 267/148, 149, 166, 61 R, 267/49; 273/DIG. 7, DIG. 23; 43/18 GF; 423/902, 369, 370, 371; 156/173

[56] References Cited

U.S. PATENT DOCUMENTS

| | | | |
|---|---|---|---|
| 494,158 | 3/1893 | North | 267/61 R |
| 1,431,401 | 10/1922 | Hupp | 267/61 R |
| 2,665,678 | 1/1954 | Bear | 267/149 X |
| 2,812,935 | 11/1957 | Setz | 267/149 |
| 2,852,424 | 9/1958 | Reinhart et al. | 267/149 X |
| 2,894,503 | 7/1959 | Pierson et al. | 273/DIG. 7 |
| 2,969,971 | 1/1961 | Nelson | 267/149 |
| 3,682,466 | 8/1972 | Huchette et al. | 267/149 X |
| 3,711,917 | 1/1973 | Baumgras | 267/166 X |
| 3,850,156 | 11/1974 | Eicholtz | 273/DIG. 7 X |
| 3,968,958 | 7/1976 | Huchette et al. | 267/149 X |
| 4,027,865 | 6/1977 | Greenwood et al. | 267/148 |
| 4,061,806 | 12/1977 | Lindler et al. | 428/35 |
| 4,260,143 | 4/1981 | Kliger | 267/148 |
| 4,422,627 | 12/1983 | Schmidt et al. | 267/148 |

FOREIGN PATENT DOCUMENTS

| | | | |
|---|---|---|---|
| 2494367 | 5/1982 | France | 267/166 |
| 34161 | 3/1977 | Japan . | |
| 6402269 | 1/1965 | Netherlands | 267/148 |
| 1333558 | 10/1973 | United Kingdom | 428/367 |
| 2021731 | 12/1979 | United Kingdom | 267/149 |

Primary Examiner—George E. A. Halvosa
Attorney, Agent, or Firm—Christensen, O'Connor, Johnson & Kindness

[57] ABSTRACT

A helical torsion spring (10) composed of unidirectional graphite fibers (26) encased in an epoxy resin matrix of rectangular cross section. The graphite fibers are longitudinally oriented relative to the core of the coil spring and can be located adjacent the inner and outer surfaces of each of the coils.

21 Claims, 2 Drawing Sheets

COMPOSITE COIL SPRING

BACKGROUND OF THE INVENTION

This application is a continuation-in-part of copending application Ser. No. 221,022, filed on Dec. 28, 1980, now abandoned.

The present invention relates to counterbalance springs, and more particularly, to helical torsion springs.

Overhead sliding doors on aircraft require some sort of counterbalance mechanism to offset the weight of the door so that it can be raised and lowered with relatively minimum manual effort. Because of compactness and reliability, coil spring counterbalances are preferred for such overhead doors. Although conventional materials such as steel alloys have been utilized for coil springs, steel alloys are relatively heavy and impose a severe weight penalty if employed in aircraft applications. It has therefore been suggested that titanium alloy springs be utilized instead of more conventional spring materials. Titanium, however, is difficult to work and is extremely expensive. Additionally, only limited quantities of titanium are available.

It was therefore an object of the present invention to isolate and identify a spring or spring material that can be substituted for titanium coil springs without incurring a weight penalty or cost penalty. It was a further object of the present invention to provide a spring material that is less expensive and lighter in weight, while providing fatigue life that is as good as or better than titanium springs and while providing a material that is relatively easy to work into the desired spring configuration.

SUMMARY OF THE INVENTION

In accordance with the foregoing objects, and other objects that will become apparent to one of ordinary skill upon reading the specification that follows, the present invention provides a helical torsion spring having a first end and a second end and comprising a plurality of serially arranged, integral coils. The coils have inner and outer surfaces. The core of each of the coils is composed of a synthetic resin and unidirectional graphite fibers that are oriented longitudinally relative to the core. The fibers are preferably located at least adjacent the inner surface and outer surface of the coil. The fibers located adjacent the outer surface have a high tensile strength and are spaced radially outward from the fibers located adjacent the inner surface which have a high compressive strength. It is most preferred that the core has a generally square cross section with radiused corners. The spring is preferably composed of an epoxy resin into which the graphite fibers located adjacent the inner and outer surfaces are embedded.

BRIEF DESCRIPTION OF THE DRAWINGS

A better understanding of the present invention can be derived by reading the ensuing specification in conjunction with the accompanying drawings wherein.

DETAILED DESCRIPTION OF THE INVENTION

Figure 2:
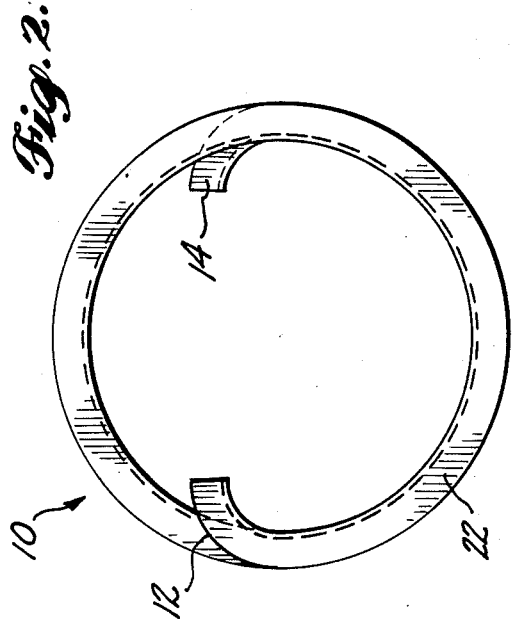
FIG. 2 is an end view of the spring illustrated in FIG. 1.
Figure 1:
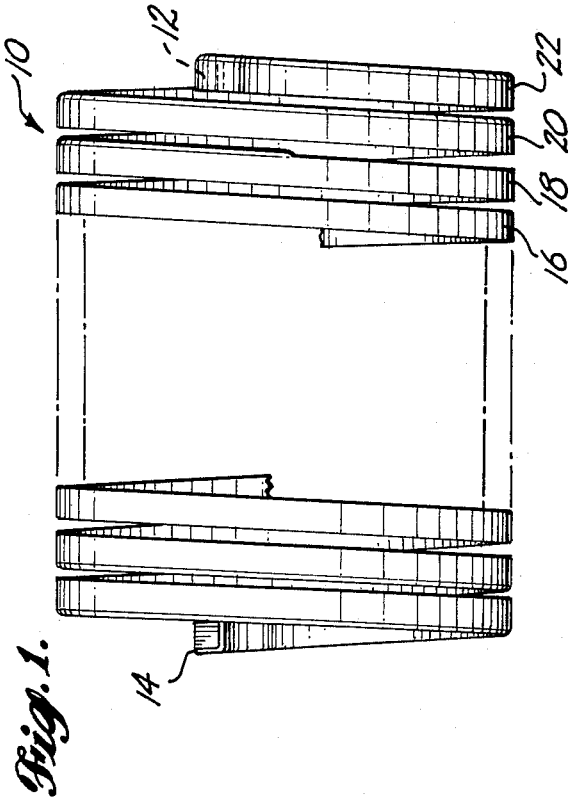
FIG. 1 is an elevation view of a coil spring constructed in accordance with the present invention.

Referring first to FIGS. 1 and 2, a coil spring 10 constructed in accordance with the present invention is illustrated. The spring 10 comprises a plurality of helical coils, although the coils can be arranged in a spiral as well. The cross section of the core of the spring is rectangular in shape. The preferred dimensions for the spring include an axial length on the order of 14 to 20 inches. It is most preferred that the width of the core of each of the coils be slightly less than the thickness, with a core width of about 0.4 inches and a core thickness of about 0.33 inches. The rectangular cross section allows the maximum number of fibers to be displaced from the neutral axis or center of the core. Furthermore, a square or rectangular construction allows all of the extreme fibers to be equally worked, thereby improving the structural efficiency over that of a circular cross section.

It is also preferred that the maximum outside diameter of the spring be about 8.8 inches while the minimum inside diameter be on the order of about 8 inches when the spring is in a relaxed condition. The spring is preferably constructed in the form of a left-hand helix, although a right-hand helix would be equally effective. Each end 12 and 14 of the spring 10 is formed into a radially inwardly extending hook. The hook preferably has a length of about 0.7 inches. The spring of the present invention is composed of a composite material including a high tensile strength fiber embedded in a synthetic resin matrix.

Figure 3:
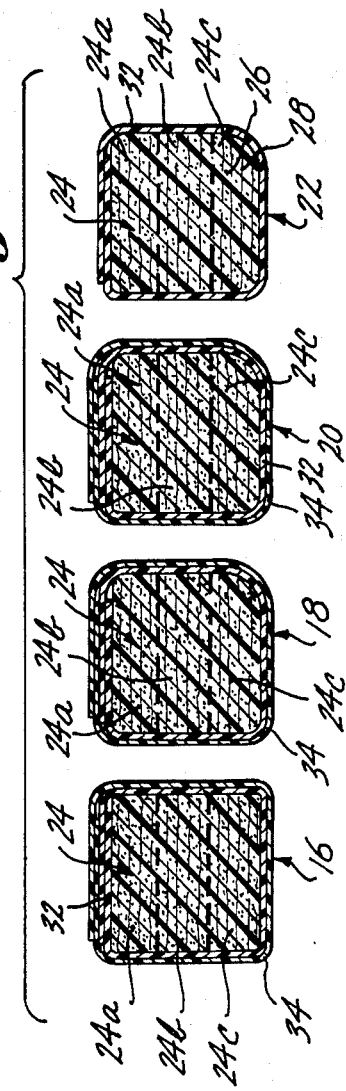
FIG. 3 is an enlarged cross-sectional view of one side of the first four coils of the spring illustrated in FIG. 1.

Referring to FIG. 3, enlarged cross sections of each of the first four coils 16, 18, 20, and 22 on the right-hand side of the spring illustrated in FIG. 1 are depicted. Beginning with the leftmost coil 16 in FIG. 3, that is, the fourth coil from the end, the core 24 is preferably composed of three layers 24a, 24b, and 24c, which preferably extend longitudinally throughout the entire length of the core. The ntire core 24 is composed of a synthetic resin into which the reinforcing fibers are embedded. It is most preferred that an epoxy-type resin be utilized, although for applications other than aircraft use, polyester and other resins may be satisfactory. In accordance with the preferred embodiment of the invention, unidirectional fibers 26 are laid longitudinally relative to core 24 for the length of spring 10. Although one of ordinary skill would clearly understand the contextual use of longitudinal herein, it is to be understood that longitudinal has no reference to the axial length of the spring, but instead to the length or longitudinal extent of the helical core 24. Fibers 26 having a high tensile strength are embedded in the outer layer 24a of core 24 adjacent the outer surface of spring 10 and fibers having a high compressive strength are embedded in the inner layer 24c of the core adjacent the inner surface of the spring.

As the central portion of core 24 is not subjected to substantial compressive or tensile loads and is really needed only to hold the outer layers 24a and 24c apart, the central layer 24b of the core 24 can be composed of a resin alone; however, it is most preferred that the central layer 24b also be reinforced with fibers. Graphite (or carbon) fibers or fiberglass fibers can be utilized in all three layers 24a, b, and c. Aramid fibers are most preferred for the central layer 24b as they are the lightest. Although aramid fibers do not have a high compressive strength, they can be used in the outer layer 24a and in the central layer 24b as these layers are not subjected to substantial compressive loads. It is also preferred that at least a limited number of short, transverse fibers 28 that are oriented transversely to unidirectional fibers 26 also be laid down in core 24 to provide lateral or transverse reinforcement to the structure. Graphite, aramid or fiberglass fibers can be employed as the transverse fibers 28.

The core 24 can be built up by conventional filament winding techniques in which unidirectional graphite fiber roving is saturated with a resin and then wound onto a mandrel having the appropriately sized helical groove machined therein resulting in unidirectional fibers 26 oriented longitudinally relative to core 24. Layers of graphite cloth can be alternated with layers of graphite roving to provide the transverse fibers 28. The spring 10 is laid up in a continuous process substituting for the graphite fibers unidirectional fibers 26 of other materials as desired and necessary to form the central layer 24b and again returning to graphite unidirectional fibers for the outside layer 24a. Since the spring is laid up continuously, the resin that is distributed throughout the core forms, upon curing, a unitary structure reinforced by the embedded fibers 26 and 28.

If desired, the first two coils 20 and 22 on the right-hand end as well as the first two coils on the left-hand end of the spring can be formed with a greater radius, at those locations where those coils contact the spring carrier, as will be explained in greater detail below. These radii can be formed in the lay-up mandrel utilizing conventional filament winding techniques. A fiberglass sheath 32 composed of resin impregnated fiberglass cloth can be wrapped about the coil spring after the initial core and end radii are formed. The fiberglass sheath prevents galvanic corrosion from occurring between the spring and the spring supports, which are normally composed of aluminum.

Lastly, an antifriction sheath 34 is wrapped about all coils of the spring except those that are in contact with the spring carriers, that is, the first coil and one-half. A preferred antifriction sheath comprises fluorinated ethylene or nylon polymers such as those respectively available under the trade name "Teflon" from E. I. duPont de Nemours & Company of Wilmington, Del., and "Duralon" from the Thermoclad Corporation, Norwalk, Calif. Other antifriction films or coatings can also be used as desired. The antifriction coating prevents abrasive wear on adjacent surfaces of the coils as the spring is wound and unwound.

Figure 5:
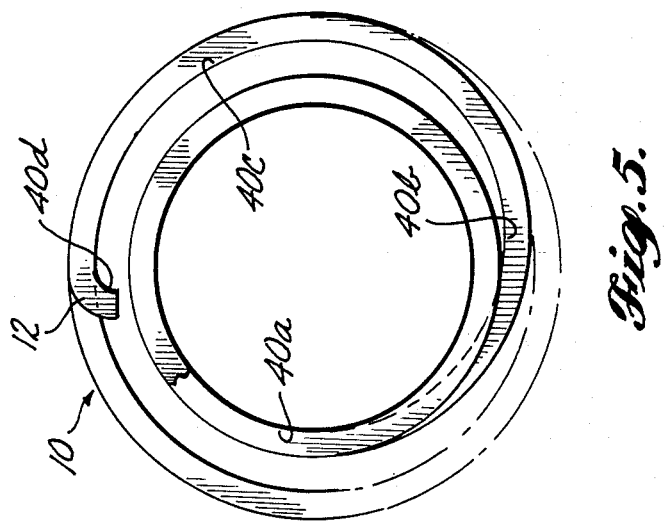
Figure 4:
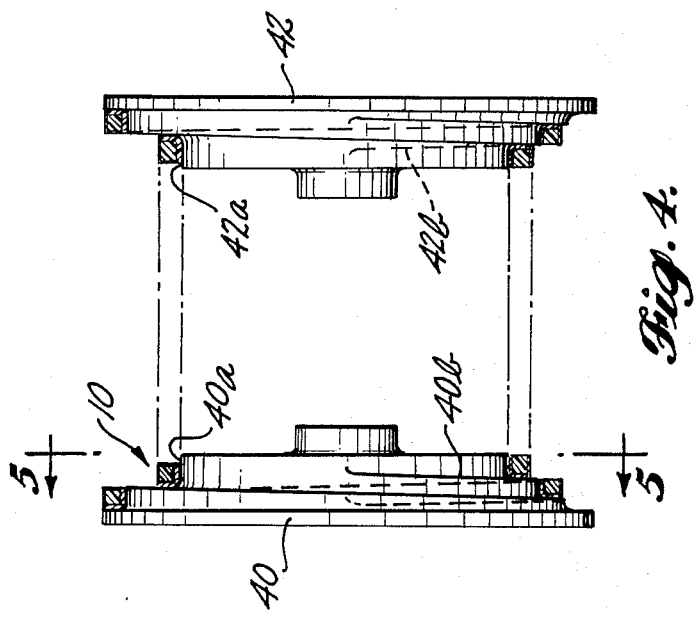
FIG. 4 is a view of a spring constructed in accordance with the present invention mounted on spring carriers that can in turn be coupled to a counterbalance mechanism; and, FIG. 5 is a cross-sectional view of FIG. 4 taken along section line 5—5.

Referring now to FIGS. 4 and 5, a spring constructed in accordance with the present invention is shown mounted on a pair of mirror-image spring carriers 40 and 42. Each of the spring carriers has a central hub for mounting on a carrier shaft. Each of the carriers has a first shoulder 40a and 42a having an outwardly facing surface, the diameter of which is equivalent to the inside diameter of the spring to be mounted thereon. On the outside of the surface is a radially oriented intersecting surface that has an axial lead-in equivalent to the angle of the spiral of the coil spring, in the preferred embodiment, a lead-in equivalent to about one coil width per revolution. The diameter of the first shoulder 40a is equivalent to the internal spring diameter in a fully loaded or fully wound condition.

When the axial lead-in reaches a shoulder depth approximately equal to or slightly greater than the width of one spring coil, the outwardly facing spring supporting surface begins a radially outwardly directed spiral shoulder 40b that extends for approximately 180° around the spring carriers. Again, an axial lead equivalent to about one coil width is employed. The radial lead on the spiral shoulder is equivalent to a radial feed of approximately 4½ coil thickness per revolution. The outwardly directed spiral shoulder terminates at 180° from its beginning and a constant diameter shoulder 40c is then created for the next 30° to 90°. The diameter of the shoulder 40c is equivalent to the internal spring diameter when spring 10 is in a relaxed condition.

A hook-receiving recess 40d is formed at the end of the constant diameter shoulder 40c to receive one end hook 12 of the spring. Retainers (not shown) can be employed adjacent the hook 12 and adjacent the beginning of the inward helical spiral, that is, at the ends of the enlarged diameter segment of the spring support surface. It is, of course, to be understood that the opposing mirror-image carrier 42 is constructed with similar spring supporting shoulders.

In use, the spring 10 is prewound several revolutions, preferably on the order of about 1900° to 2000° from its fully relaxed condition. During normal cycling, the spring is then unwound to about 1000° from its prewound condition. In the partially wound condition, the diameter of the spring is intermediate the fully wound diameter and the fully relaxed diameter. When spring 10 is fully wound, the portion of the spring contacting the enlarged spring support surface 40c is virtually unstressed. An increasing bending load is gradually introduced into the spring 10 along the helical spiral surface 40b while the stored counterbalancing energy is carried in the unsupported portions of the spring spanning the two carriers 40 and 42.

It is expected that the composite spring of the present invention, which is virtually the same size as an equivalent titanium spring, will be able to outlast such an equivalent spring. In addition, the weight of the composite spring is about half that of a titanium spring, while the cost is only a fraction of the titanium spring. Since about eight springs will be utilized for a typical new-generation commercial aircraft, the anticipated weight savings per airplane will be on the order of 80 to 100 pounds when contrasted with titanium springs, and certainly substantially more than conventional spring materials. It is also anticipated that utilization of the composite springs will save tens of thousands of dollars per aircraft as compared with aircraft outfitted with titanium springs.

The present invention has been disclosed in relation to a preferred embodiment and alternates thereto. Generally, however, the present invention is operable with all springs that are stressed in the bending mode. One of ordinary skill will therefore, after reading the foregoing specification, be able to effect various alterations, substitutions of equivalents, and other changes to the disclosed embodiment without departing from the broad concepts imparted herein. For example, boron fibers can be substituted for the preferred graphite fibers. Accordingly, it is intended that the protection afforded by Letters Patent granted hereon be limited only by the definition contained in the appended claims and equivalents thereof.

The embodiments of the invention in which an exclusive property or privilege is claimed are defined as follows:

1. A helical torsion spring comprising:
   a plurality of coils having a first end and a second end, said coils having an inner surface and an outer surface; and,
   a continuous core extending through said coils, said core being composed of a synthetic resin and unidirectional fibers oriented longitudinally relative to said core, said fibers being located adjacent said inner surface and said outer surface of said coils and in the central portion of said core, said fibers located adjacent said outer surface having a high tensile strength and being spaced radially outward from said fibers located adjacent said inner surface which have a high compressive strength, said fibers located adjacent said outer surface being aramid fibers, and said fibers located in the central portion of said core being aramid fibers.

2. The spring of claim 1 wherein said core has a generally rectangular cross section.

3. The spring of claim 1 further comprising:
   reinforcing fibers transversely disposed in said core at least adjacent said inner and said outer surface portions.

4. The spring of claim 1 wherein said resin comprises an epoxy resin.

5. The spring of claim 1 further comprising:
   reinforcing fibers transversely disposed in the central portion of said core.

6. The spring of claim 1 further comprising an antifriction coating surrounding said core.

7. The spring of claim 6 wherein said coating comprises a fluorinated ethylene polymer film.

8. The spring of claim 1 further comprising a fiberglass sheath surrounding said core.

9. The spring of claim 8 further comprising an antifriction coating surrounding said fiberglass sheath.

10. The spring of claim 1 further comprising an increased radius forming a portion of and integral with said core adjacent both said first and second ends.

11. The spring of claim 1 wherein the fibers adjacent said inner surface are graphite fibers.

12. A helical torsion spring comprising:
    a plurality of coils having a first end and a second end, said coils having an inner surface and an outer surface; and,
    a continuous core extending through said coils, said core being composed of a synthetic resin and unidirectional fibers oriented longitudinally relative to said core, said fibers being located adjacent said inner surface and said outer surface of said coils and in the central portion of said core, said fibers located adjacent said outer surface having a high tensile strength and being spaced radially outward from said fibers located adjacent said inner surface which have a high compressive strength, said fibers adjacent said inner and outer surfaces being graphite fibers, and said fibers located in the central portion of said core being aramid fibers.

13. The spring of claim 12 further comprising:
    reinforcing fibers transversely disposed in said core at least adjacent said inner and said outer surface portions.

14. The spring of claim 12 wherein said core has a generally rectangular cross section.

15. The spring of claim 12 wherein said resin comprises an epoxy resin.

16. The spring of claim 12 further comprising:
    reinforcing fibers transversely disposed in the central portion of said core.

17. The spring of claim 12 further comprising an antifriction coating surrounding said core.

18. The spring of claim 17 wherein said coating comprises a fluorinated ethylene polymer film.

19. The spring of claim 12 further comprising a fiberglass sheath surrounding said core.

20. The spring of claim 19 further comprising an antifriction coating surrounding said fiberglass sheath.

21. The spring of claim 12 further comprising an increased radius forming a portion of and integral with said core adjacent both said first and second ends.

* * * * *

UNITED STATES PATENT AND TRADEMARK OFFICE
CERTIFICATE OF CORRECTION

PATENT NO. : 4,765,602

DATED : August 23, 1988

INVENTOR(S) : William G. Roeseler

It is certified that error appears in the above-identified patent and that said Letters Patent is hereby corrected as shown below:

Column 2, line 45: "ntire" should be --entire--

Column 4, line 11: "thickness" should be --thicknesses--

Signed and Sealed this

Seventeenth Day of January, 1989

Attest:

DONALD J. QUIGG

*Attesting Officer*          *Commissioner of Patents and Trademarks*